US008613401B2

(12) United States Patent
Fornaci et al.

(10) Patent No.: US 8,613,401 B2

(45) Date of Patent: Dec. 24, 2013

(54) ROCK DUST BLOWER AND METHOD

(75) Inventors: Michael J. Fornaci, Oakland, NJ (US); William J. Fornaci, Hawthorne, NJ (US); John R. Rodriquez, Rockaway, NJ (US); Basil J. Fornaci, Hawthorne, NJ (US); Istvan J. Kiss, Oakland, NJ (US)

(73) Assignee: Hafco Foundry and Machine Company, Incorporated, Midland Park, NJ (US)

( * ) Notice: Subject to any disclaimer, the term of this patent is extended or adjusted under 35 U.S.C. 154(b) by 259 days.

(21) Appl. No.: 13/275,399

(22) Filed: Oct. 18, 2011

(65) Prior Publication Data

US 2013/0092764 A1 Apr. 18, 2013

(51) Int. Cl.
*A01C 3/06* (2006.01)

(52) U.S. Cl.
USPC ............. 239/654; 239/85; 239/142; 239/144; 22/196; 169/64; 299/12

(58) Field of Classification Search
USPC ............ 239/85, 142, 144, 654; 406/140, 143, 406/146; 222/196, 630; 299/12; 169/64
See application file for complete search history.

(56) References Cited

U.S. PATENT DOCUMENTS

| | | | |
|---|---|---|---|
| 1,357,663 A | | 11/1920 | Von Porat |
| 1,564,880 A | | 12/1925 | Mauser |
| D197,734 S | | 3/1964 | Wahl |
| 3,194,443 A | | 7/1965 | Gurney |
| 3,333,896 A | | 8/1967 | Diamanti |
| 3,415,450 A | | 12/1968 | Hawk, Sr. |
| 4,109,861 A | | 8/1978 | McHugh |
| 4,286,723 A | | 9/1981 | Schutz |
| 4,394,975 A | | 7/1983 | Bare, Jr. et al. |
| 4,538,941 A | | 9/1985 | Thorne |
| D283,935 S | | 5/1986 | Culshaw |
| 5,071,028 A | | 12/1991 | Murphy |
| 5,269,463 A | | 12/1993 | Burks |
| 5,458,264 A | | 10/1995 | Schaffer et al. |
| 5,618,177 A | * | 4/1997 | Abbott .......................... 239/144 |
| 6,135,368 A | | 10/2000 | Protan |
| 6,398,462 B1 | * | 6/2002 | Fulkerson ..................... 406/143 |
| 6,830,414 B2 | | 12/2004 | Kia et al. |
| D663,914 S | | 7/2012 | Howard |
| 2003/0150928 A1 | | 8/2003 | Watanebe et al. |

* cited by examiner

*Primary Examiner* — Steven J Ganey
(74) *Attorney, Agent, or Firm* — Arthur Jacob

(57) ABSTRACT

A rock dust blower and method draws rock dust from a portable supply of rock dust, in response to a flow of pressurized air, and entrains the drawn rock dust in a stream of the air for direction to selected surfaces of a coal mine. The supply is contained in a substantially vertical column and rock dust is drawn from the column along a peripheral edge of the column located adjacent the lower end of the column to thereby militate against cavitation of the rock dust adjacent the center of the column as rock dust is drawn from the supply. A vibrator mechanism can be employed to transmit vibration to the supply and thereby facilitate an even distribution of rock dust in the supply and a smooth and continuous flow of rock dust as rock dust is drawn from the supply.

15 Claims, 5 Drawing Sheets

ROCK DUST BLOWER AND METHOD

The present invention relates generally to the application of rock dust to surfaces of a coal mine and pertains, more specifically, to a rock dust blower and method for drawing rock dust from a portable supply of rock dust and entraining the drawn rock dust in a stream of pressurized air for direction to selected surfaces of a coal mine, such as the ceiling, floor and side walls of a mine shaft or tunnel.

It has been demonstrated that explosions in coal mines can be avoided by covering or otherwise diluting coal dust generated by mining operations with rock dust. In view of the highly explosive nature of coal dust in a coal mine, sparks produced by certain mining equipment can be responsible for igniting coal dust present in a mine shaft or tunnel, causing a catastrophic explosion. By applying rock dust to surfaces of the mine, namely, along the ceiling, the floor and the side walls of a mine shaft or tunnel, rock dust is mixed with the coal dust present in the mine, rendering the coal dust essentially benign, that is, the explosive characteristics of the coal dust are reduced to the point where a catastrophic explosion is avoided. Indeed, the United States Bureau of Mines has recognized the value of using rock dust to abate the danger of coal dust explosions and has prescribed the application of rock dust as a solution to the problem of explosions caused by coal dust in coal mines.

While a variety of equipment has been proposed for accomplishing the application of rock dust to surfaces of a coal mine, heretofore most such equipment has been found to be either cumbersome or otherwise lacking in ease of use or effectiveness. The present invention provides a readily portable apparatus capable of operation in an effective method for applying rock dust to selected surfaces of a coal mine so as to reduce the hazard of explosions caused by coal dust. As such, the present invention attains several objects and advantages, some of which are summarized as follows: Provides a highly portable rock dust blower that operates in response to air under pressure for directing air-entrained rock dust to selected surfaces of a coal mine; enables increased ease, accuracy and effectiveness in selectively directing rock dust to the ceiling, floor and side walls of a coal mine shaft or tunnel to abate the hazard of coal dust explosions, and does so without introducing into the coal mine equipment which itself might add to the risk of such an explosion; facilitates the drawing of rock dust from a portable supply and entraining the drawn rock dust in a stream of pressurized air, utilizing highly portable equipment for increased effectiveness, greater efficiency and exceptionally reliable operation; enables effective drawing of rock dust from a portable supply without disruption, as might be caused by cavitation within the supply, during rock dust applying operations; provides an apparatus of relatively simple construction, capable of economical manufacture and increased versatility in the effective application of rock dust to coal mine surfaces; reduces, to the point of virtual elimination, the hazard of coal dust explosions in coal mining operations; provides a relatively compact, highly portable apparatus for ready handling and effective use in a wide variety of coal mining venues; provides a rugged apparatus of relatively simple construction capable of reliable operation over an extended service life.

The above objects and advantages, as well as further objects and advantages, are attained by the present invention, which may be described briefly as a rock dust blower for drawing rock dust from a portable supply of rock dust, in response to a flow of pressurized air, and entraining the drawn rock dust in a stream of the air for direction to selected surfaces of a coal mine, the rock dust blower comprising: a receptacle having an interior extending between an upper top and a lower bottom, the interior being configured for containing the supply of rock dust in a substantially vertical column having an upper end adjacent the top of the interior, a lower end adjacent the bottom of the interior, a substantially central axis, and a substantially horizontal cross-section including a peripheral edge adjacent the bottom of the receptacle; an extractor responsive to the flow of the pressurized air for entraining rock dust within the stream of the air, the extractor having an intake for reception of rock dust from the interior of the receptacle and an output for emitting the stream of air and entrained rock dust; and at least one passage communicating with the intake of the extractor and the interior of the receptacle for passing rock dust drawn from the column for entrainment within the stream of air, the passage having an inlet placed for being located adjacent the peripheral edge of the column so as to draw rock dust from the column along the peripheral edge of the column and thereby militate against cavitation of the rock dust adjacent the substantially central axis of the column as rock dust is drawn from the interior of the receptacle.

In addition, the present invention provides a method for drawing rock dust from a portable supply of rock dust, in response to a flow of pressurized air, and entraining the drawn rock dust in a stream of the air for direction to selected surfaces of a coal mine, the method comprising: containing the supply of rock dust within a substantially vertical column having an upper end, a lower end, a substantially central axis, and a substantially horizontal cross-section including a peripheral edge adjacent the lower end; drawing rock dust from the supply to entrain drawn rock dust in the stream of the air, the rock dust being drawn from the column at the peripheral edge of the column to thereby militate against cavitation of the rock dust adjacent the substantially central axis of the column as rock dust is drawn from the supply; and emitting the stream of air and entrained rock dust.

The invention will be understood more fully, while still further objects and advantages will become apparent, in the following detailed description of preferred embodiments of the invention illustrated in the accompanying drawing, in which.

Figure 1:
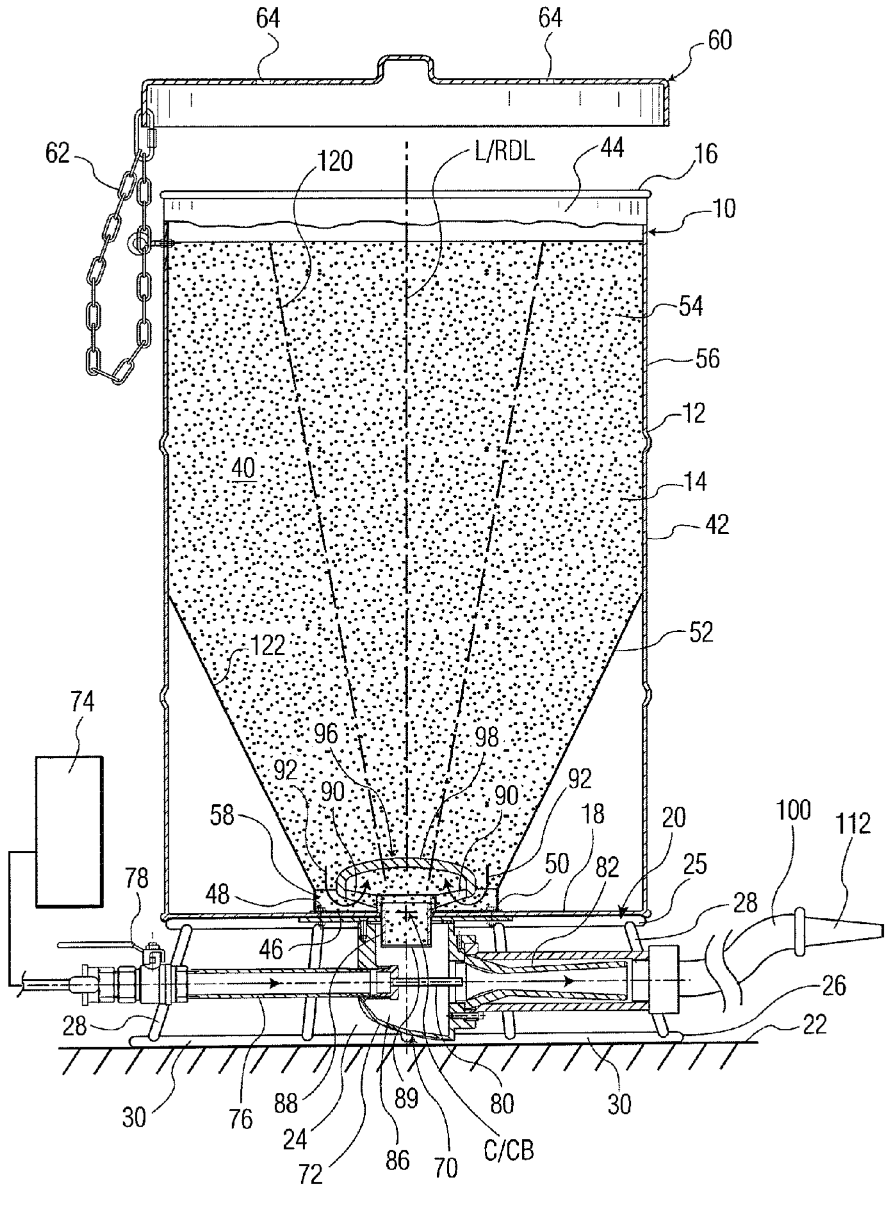
FIG. 1 is a side elevational view, partially exploded, largely in cross-section and somewhat diagrammatic, illustrating a rock dust blower constructed in accordance with the present invention.
Figure 2:
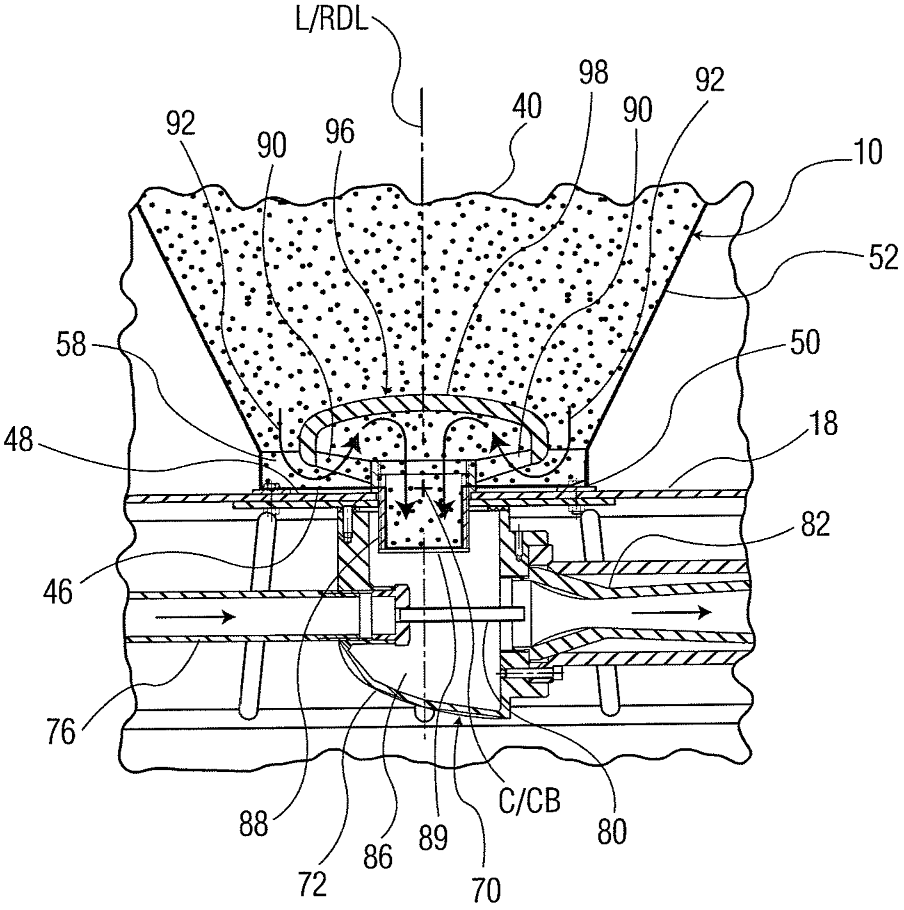
FIG. 2 is an enlarged, fragmentary view showing a portion of FIG. 1.
Figure 3:
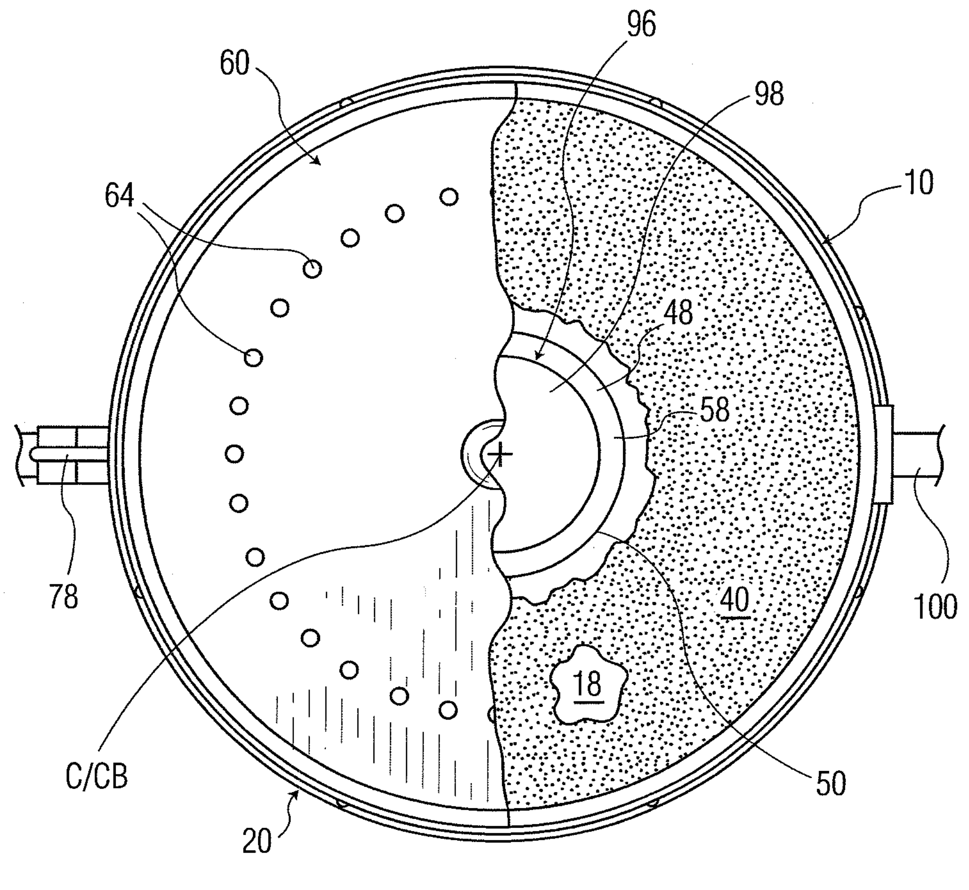
FIG. 3 is a top plan view of the rock dust blower, partially in cross-section.
Figure 4:
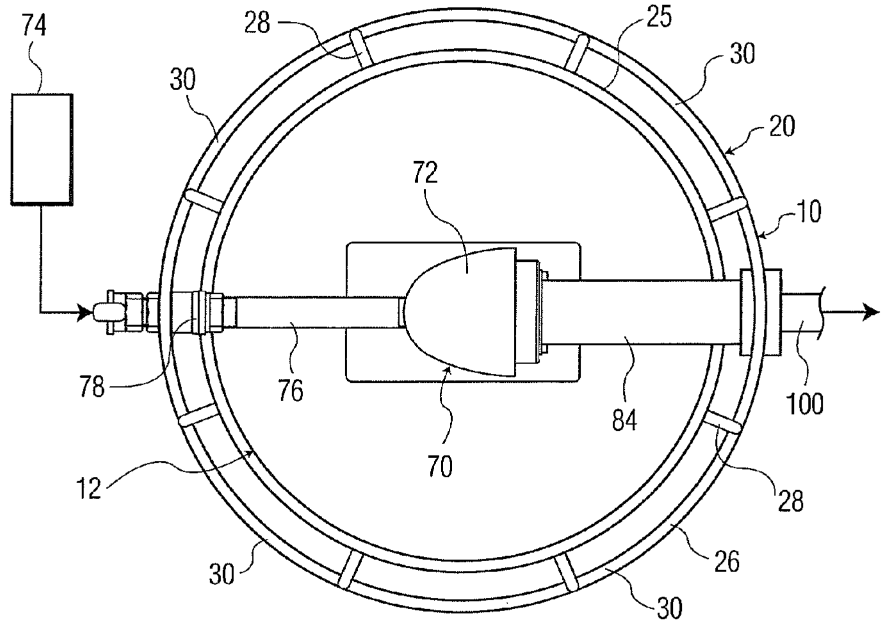
FIG. 4 is a bottom plan view of the rock dust blower.

Referring now to the drawing, and especially to FIGS. 1 through 4 thereof, a rock dust blower constructed in accordance with the present invention is illustrated at 10 and is seen to include a receptacle in the form of a drum 12 having an interior 14 extending between an upper top 16 and a lower bottom 18 with a center CB. Drum 12 conveniently and economically is in the form of a conventional fifty-five gallon drum providing interior 14 with a generally circular cylindrical configuration having a substantially central axis L passing through the center CB, while enabling the construction of a simplified, economical and relatively lightweight, easily portable apparatus. Drum 12 is mounted upon a base 20 and is affixed to the base 20 so that upon resting the base 20 on a support surface 22, such as the floor of a coal mine, the bottom 18 of the drum 12 is raised from the support surface 22, providing a space 24 immediately beneath the bottom 18 of the drum 12. In the preferred construction, base 20 has a cage-like, frustro-conical configuration, established by a smaller diameter upper ring 25 affixed directly to the drum 12 and a larger diameter lower ring 26 connected to the upper ring 25 by a plurality of circumferentially spaced apart struts 28, making available the circular lower ring 26 for rolling the rock dust blower 10 from location to location, and providing accessible segments 30 of the lower ring 26, extending between adjacent struts 28, any of which segments 30 can be employed as a handle to be grasped in carrying the rock dust blower 10 to a selected location within a coal mine and manipulating the rock dust blower 10 into a desired position for use at the selected location.

When the rock dust blower 10 is in place for use, a supply of rock dust 40 is contained within the interior 14 of drum 12 in a substantially vertical column 42 having an upper end 44 adjacent the top 16 of the drum 12, a lower end 46 at the bottom 18 of the drum 12, a substantially central axis RDL coincident with central axis L of interior 14, a generally horizontal cross-section 48 including a center C placed at the central axis RDL, and a peripheral edge 50 adjacent the bottom 18 of the drum 12. In the preferred construction, interior 14 has a hopper-like configuration in which a funnel-shaped portion is provided by a lower wall section 52 extending vertically downwardly and tapered between a larger volume interior portion 54 provided by an upper wall section 56 adjacent the top 16 of the drum 12 and a smaller volume interior portion 58 adjacent the bottom 18 of the drum 12, with the peripheral edge 50 substantially centered about the axis RDL. A cover 60 is placed over the drum 12, at the top 16 of the interior 14, to prevent the admission of unwanted debris and the like, and a safety chain 62 is secured between the cover 60 and the drum 12 to assure that the cover 60 is tethered to and always accompanies the drum 12. Vent holes 64 are placed in the cover 60 for purposes to be described below.

An extractor is shown generally at 70 and includes a housing 72 placed within the space 24 beneath the bottom 18 of the drum 12 and secured to the bottom 18. Extractor 70 draws rock dust 40 from the interior 14 of drum 12 in response to the flow of a pressurized air through the extractor 70, the air being supplied to the extractor 70 from a remote supply 74 of compressed air connected to an input conduit 76 through an input valve 78. Air under pressure is admitted to the extractor 70 and is passed through a nipple 80 to a venturi tube 82 and then emitted from the extractor 70 through an output conduit 84. A lowered pressure thus is established within the venturi tube 82 and adjacent chamber 86 of the extractor 70, and rock dust 40 from the column 42 is drawn into the chamber 86 through an intake 88 located adjacent center CB of the bottom 18 of drum 12, at the central axis L, and through a screen 89 juxtaposed with intake 88. Intake 88 communicates with chamber 86 and with the column 42 through a plurality of passages 90 spaced circumferentially around the intake 88, each passage 90 extending between the intake 88 and a corresponding inlet 92 placed adjacent the peripheral edge 50 of the horizontal cross-section 48 at the lower end 46 of the column 42 of rock dust 40. Passages 90 are established by a diverter member shown in the form of a mushroom-shaped member 96 having a diverter cap 98 placed over the intake 88 and extending in radial directions from the central axis L to adjacent the peripheral edge 50 of the horizontal cross-section 48 at the lower end 46 of the column 42 of rock dust 40 to separate the column 42 from direct communication with intake 88 and divert the drawn rock dust 40 to the passages 90, through inlets 92. In this manner, rock dust 40 is drawn from column 42 along peripheral edge 50, through an annular area established within cross-section 48, adjacent peripheral edge 50, between diverter cap 98 and peripheral edge 50, and is entrained in a stream of air carried to output conduit 84 where a hose 100 of selected length delivers the stream of air with entrained rock dust to a nozzle 112 for direction to a selected surface of a coal mine. The vent holes 62 in cover 60 prevent the formation of a partial vacuum at the top 16 of the drum 12 as rock dust 40 is drawn from the column 42, which partial vacuum could disrupt the flow of rock dust 40 to the extractor 70. Screen 89 prevents any debris or other unwanted matter that may be present in the supply of rock dust 40 from entering chamber 72 and clogging the venturi tube 82 or otherwise interfering with the entrainment of rock dust 40 within the stream of air.

Diversion of rock dust 40 so as to be drawn from along the peripheral edge 50 of the column 42, rather than from along the central axis L, militates against cavitation within the column 42, which could occur if rock dust were to be drawn from the center C of the horizontal cross-section 48, as illustrated in phantom by a potential cavity which otherwise could be formed at 120. Such cavitation could disrupt the smooth, continuous flow of rock dust from the interior 14 of the drum 12, with rock dust tending to remain adjacent the wall sections 52 and 56 of the drum 12 as a cavity 120 is formed along central axis L, thereby reducing efficiency as well as interrupting the continuous application of all of the rock dust within the supply of rock dust in the rock dust blower. In order further to facilitate a smooth and continuous flow of rock dust 40 from the column 42, from along the periphery of the column 42, rather than from along the central axis L, the wall sections 52 and 56 along the interior 14 advantageously are coated with a low-friction coating 122, such as a low-friction paint, thereby providing interior surfaces along the wall sections 52 and 56 which militate against any clinging of rock dust along those surfaces.

Figure 5:
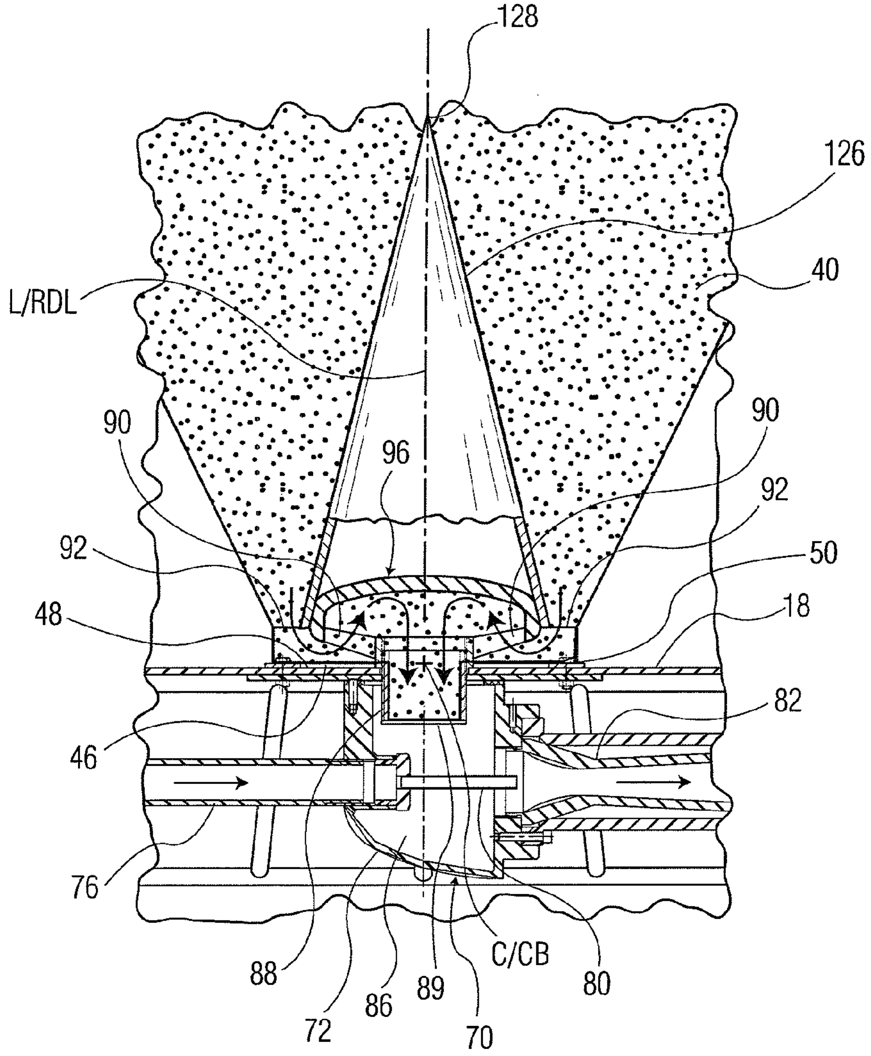
FIG. 5 is an enlarged, fragmentary view similar to FIG. 2, and showing an alternate embodiment.

In the embodiment of FIG. 5, an optional diverter structure in the form of a diverter cone 126 is affixed to mushroom-shaped member 96 and tapers upwardly toward upper top 16 of drum 12, along axis RDL, to a tip 128 adjacent upper end 44 of column 42, further to facilitate the flow of rock dust 40 to inlets 92 and into passages 90, through the annular area at cross-section 48, thereby further militating against deleterious cavitation, along central axis L, within the supply of rock dust 40.

Figure 6:
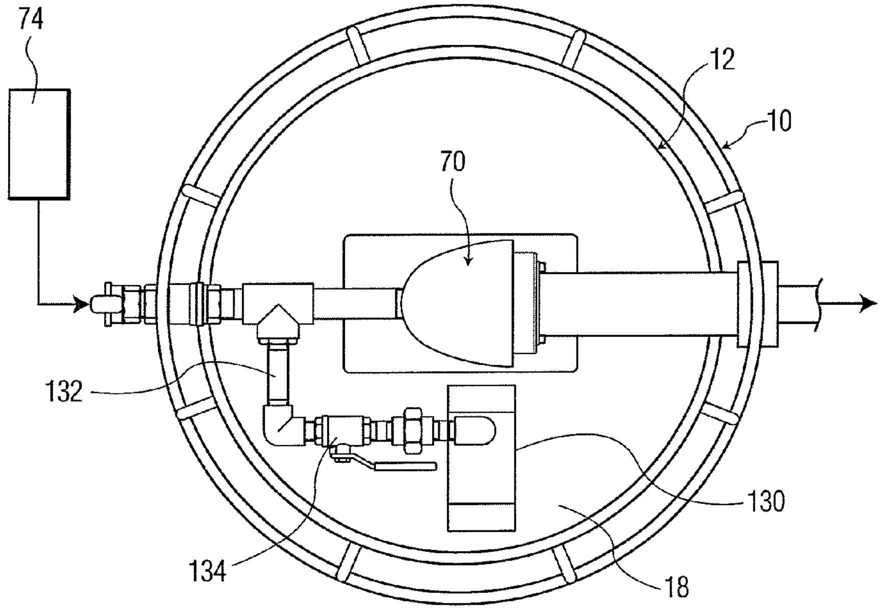
FIG. 6 is a bottom plan view, similar to FIG. 4, and showing another embodiment.

Turning now to FIG. 6, in another embodiment of the present invention, rock dust blower 10 is modified by being provided with a vibrator 130, preferably coupled with the bottom 18 of the drum 12, so as to agitate the supply of rock dust within the drum 12 during operation of the rock dust blower 10. Vibrator 130 operates in response to the flow of a pressurized air and, in the illustrated embodiment, operates in response to pressurized air supplied from supply 74 through a branch conduit 132 and a branch valve 134 when rock dust blower 10 is in operation. Agitation of the supply of rock dust within the interior of drum 12 militates against caking or other agglomeration of the rock dust, thereby further assuring a smooth and continuous feed of rock dust as rock dust is drawn from the column supply of rock dust into extractor 70. A suitable pressurized air-responsive vibrator is available readily through commercial sources.

It will be seen that the present invention attains all of the objects and advantages summarized above, namely: Provides a highly portable rock dust blower that operates in response to air under pressure for directing air-entrained rock dust to selected surfaces of a coal mine; enables increased ease, accuracy and effectiveness in selectively directing rock dust to the ceiling, floor and side walls of a coal mine shaft or tunnel to abate the hazard of coal dust explosions, and does so without introducing into the coal mine equipment which itself might add to the risk of such an explosion; facilitates the drawing of rock dust from a portable supply and entraining the drawn rock dust in a stream of pressurized air, utilizing highly portable equipment for increased effectiveness, greater efficiency and exceptionally reliable operation; enables effective drawing of rock dust from a portable supply without disruption, as might be caused by cavitation within the supply, during rock dust applying operations; provides an apparatus of relatively simple construction, capable of economical manufacture and increased versatility in the effective application of rock dust to coal mine surfaces; reduces, to the point of virtual elimination, the hazard of coal dust explosions in coal mining operations; provides a relatively compact, highly portable apparatus for ready handling and effective use in a wide variety of coal mining venues; provides a rugged apparatus of relatively simple construction capable of reliable operation over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A rock dust blower for drawing rock dust from a portable supply of rock dust, in response to a flow of pressurized air, and entraining the drawn rock dust in a stream of the air for direction to selected surfaces of a coal mine, the rock dust blower comprising:

a receptacle having an interior extending between an upper top and a lower bottom, the interior being configured for containing the supply of rock dust in a substantially vertical column having an upper end adjacent the top of the interior, a lower end adjacent the bottom of the interior, a substantially central axis, and a substantially horizontal cross-section including a peripheral edge adjacent the bottom of the receptacle;

an extractor responsive to the flow of the pressurized air for entraining rock dust within the stream of the air, the extractor having an intake for reception of rock dust from the interior of the receptacle and an output for emitting the stream of air and entrained rock dust; and at least one passage communicating with the intake of the extractor and the interior of the receptacle for passing rock dust drawn from the column for entrainment within the stream of air, the passage having an inlet spaced horizontally from the substantially central axis for being located adjacent the peripheral edge of the column so as to draw rock dust from the column along the peripheral edge of the column and thereby militate against cavitation of the rock dust adjacent the substantially central axis of the column as rock dust is drawn from the interior of the receptacle.

2. The rock dust blower of claim 1 wherein the bottom of the receptacle includes a center for location adjacent the central axis of the column, and the intake of the extractor is placed at the bottom of the receptacle, adjacent the center of the bottom.

3. The rock dust blower of claim 1 including a vibrator mechanism coupled to the receptacle for transmitting vibration to the supply of rock dust as rock dust is drawn from the supply.

4. The rock dust blower of claim 3 wherein the vibrator mechanism transmits vibration in response to the flow of pressurized air to the vibrator mechanism.

5. The rock dust blower of claim 4 wherein the vibrator mechanism is affixed to the receptacle at the bottom of the receptacle.

6. A rock dust blower for drawing rock dust from a portable supply of rock dust, in response to a flow of pressurized air, and entraining the drawn rock dust in a stream of the air for direction to selected surfaces of a coal mine, the rock dust blower comprising:

a receptacle having an interior extending between an upper top and a lower bottom, the interior being configured for containing the supply of rock dust in a substantially vertical column having an upper end adjacent the top of the interior, a lower end adjacent the bottom of the interior, a substantially central axis, and a substantially horizontal cross-section including a peripheral edge adjacent the bottom of the receptacle;

an extractor responsive to the flow of the pressurized air for entraining rock dust within the stream of the air, the extractor having an intake for reception of rock dust from the interior of the receptacle and an output for emitting the stream of air and entrained rock dust; and a plurality of passages communicating with the intake of the extractor and the interior of the receptacle for passing rock dust drawn from the column for entrainment within the stream of air, each passage having a corresponding inlet for location adjacent the peripheral edge of the column so as to draw rock dust from the column along the peripheral edge of the column, the inlets being spaced apart circumferentially from one another along the peripheral edge to thereby militate against cavitation of the rock dust adjacent the substantially central axis of the column as rock dust is drawn from the interior of the receptacle.

7. The rock dust blower of claim 6 wherein the bottom of the receptacle includes a center for location adjacent the central axis of the column, and the intake of the extractor is placed at the bottom of the receptacle, adjacent the center of the bottom.

8. The rock dust blower of claim 6 wherein the interior of the receptacle includes a hopper-like configuration providing a larger volume interior portion adjacent the upper top of the interior and tapering to a smaller volume interior portion adjacent the lower bottom of the interior, and the passages communicate with the smaller volume interior portion.

9. The rock dust blower of claim 8 wherein the bottom of the receptacle includes a center for location adjacent the central axis of the column, and the intake of the extractor is placed at the bottom of the receptacle, adjacent the center of the bottom.

10. The rock dust blower of claim 9 wherein the interior of the receptacle includes a circular cylindrical configuration providing a funnel-shaped configuration between the upper top of the interior and the lower bottom of the interior.

11. The rock dust blower of claim 10 including a diverter member placed between the interior of the receptacle and the intake of the extractor, the diverter member including a diverter cap located over the intake for separating the lower end of the column of rock dust in the supply from the intake, the passages extending beneath the diverter cap such that rock dust from the column will be drawn from adjacent the peripheral edge of the column and through the passages to the intake of the extractor, and rock dust will be diverted from the substantially central axis of the column toward the peripheral edge of the column and through an annular cross-sectional area adjacent the bottom of the column, thereby militating against cavitation within the supply of rock dust as rock dust is drawn from the column.

12. The rock dust blower of claim 10 including a diverter member placed between the interior of the receptacle and the intake of the extractor, the diverter member including a diverter cone located over the intake and tapering upwardly toward a tip adjacent the tip of the receptacle for separating the lower end of the column of rock dust in the supply from the intake, the passages extending beneath the diverter cone such that rock dust from the column will be drawn from adjacent the peripheral edge of the column and through the passages to the intake of the extractor, and rock dust will be diverted from the substantially central axis of the column toward the peripheral edge of the column and through an annular cross-sectional area adjacent the bottom of the column, thereby militating against cavitation within the supply of rock dust as rock dust is drawn from the column.

13. A method for drawing rock dust from a portable supply of rock dust, in response to a flow of pressurized air, and entraining the drawn rock dust in a stream of the air for direction to selected surfaces of a coal mine, the method comprising:

containing the supply of rock dust within a substantially vertical column having an upper end, a lower end, a substantially central axis, and a substantially horizontal cross-section including a peripheral edge adjacent the lower end;

drawing rock dust from the supply to entrain drawn rock dust in the stream of the air, the rock dust being drawn from the column through at least one passage having an inlet spaced horizontally from the substantially central axis so as to be located adjacent the peripheral edge of the column to thereby militate against cavitation of the rock dust adjacent the substantially central axis of the column as rock dust is drawn from the supply; and emitting the stream of air and entrained rock dust.

14. The method of claim 13 wherein the rock dust being drawn from the column is drawn through inlets placed at corresponding locations spaced circumferentially around the column along the peripheral edge of the column.

15. The method of claim 13 including transmitting vibration to the column of rock dust as rock dust is drawn from the supply.

* * * * *